US008128798B2

(12) United States Patent
Adachi et al.

(10) Patent No.: US 8,128,798 B2
(45) Date of Patent: Mar. 6, 2012

(54) LIQUID TRANSFER DEVICE

(75) Inventors: Sakuichiro Adachi, Hachioji (JP); Kunio Harada, Hachioji (JP); Hideo Enoki, Kasumigaura (JP); Hironobu Yamakawa, Tokyo (JP); Nobuhiro Tsukada, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 388 days.

(21) Appl. No.: 12/307,275

(22) PCT Filed: Jun. 15, 2007

(86) PCT No.: PCT/JP2007/062080

§ 371 (c)(1), (2), (4) Date: Mar. 10, 2009

(87) PCT Pub. No.: WO2008/007511

PCT Pub. Date: Jan. 17, 2008

(65) Prior Publication Data

US 2009/0321262 A1 Dec. 31, 2009

(30) Foreign Application Priority Data

Jul. 10, 2006 (JP) ................................ 2006-188786

(51) Int. Cl.
*G01N 27/447* (2006.01)
*B01L 3/00* (2006.01)

(52) U.S. Cl. ........................................ 204/600; 422/503

(58) Field of Classification Search .......... 204/600–621, 204/450–455; 422/503

See application file for complete search history.

(56) References Cited

U.S. PATENT DOCUMENTS

| | | | |
|---|---|---|---|
| 4,390,403 A | 6/1983 | Batchelder | |
| 4,636,785 A | 1/1987 | Le Pesant | |
| 5,181,016 A * | 1/1993 | Lee | 345/84 |
| 2005/0072676 A1 * | 4/2005 | Cummings et al. | 204/547 |
| 2006/0097155 A1 * | 5/2006 | Adachi et al. | 250/288 |

FOREIGN PATENT DOCUMENTS

| | | |
|---|---|---|
| CN | 1769896 A | 5/2006 |
| EP | 1 652 582 A2 | 5/2006 |
| JP | 59-206868 | 11/1984 |
| JP | 10-267801 | 10/1998 |
| JP | 2005-30985 | 2/2005 |
| JP | 2005-274573 | 10/2005 |
| JP | 2006-58031 | 3/2006 |
| JP | 2006-125900 | 5/2006 |

OTHER PUBLICATIONS

Applied Physics Letters, vol. 77, No. 11, Sep. 11, 2000, "Electrowetting-Based Actuation of Liquid Droplets for Microfluidic Applications".

* cited by examiner

*Primary Examiner* — Jeffrey T Barton
*Assistant Examiner* — Maris R Kessel
(74) *Attorney, Agent, or Firm* — Mattingly & Malur, PC

(57) ABSTRACT

A liquid transfer device electrically controls liquid position. The surface of the liquid transfer device is provided with unevenness in order to solve a problem of having a large number of electrodes for controlling voltage. The number of electrodes for controlling voltage can be halved by the utilization of a restoring force of the liquid to a spherical shape by surface tension, in addition to an electrical force.

13 Claims, 7 Drawing Sheets

LIQUID TRANSFER DEVICE

INCORPORATION BY REFERENCE

The present application claims priority from Japanese application JP-2006-188786 filed on Jul. 10, 2006, the content of which is hereby incorporated by reference into this application.

TECHNICAL FIELD

The present invention relates to a liquid transfer device for transferring a liquid, and more specifically relates to a liquid transfer device for analysis or reaction.

BACKGROUND ART

As a device for analyzing quantitatively the components in a solution, an absorption spectroscopic analysis apparatus has been widely used, which irradiates a light from a light source to the solution, disperses transmitted light by a diffraction grating, and executes absorption measurement for each wavelength. In such an analysis apparatus, in recent years, to reduce reagent cost and lower the load to the environment, it has been required to reduce an amount of reaction liquid. However, in the case where the amount of reaction liquid is reduced, in a conventional reaction container, there has been a problem of generation of air bubbles in dispensing and mixing, making correct measurement difficult, because a total of five surfaces of the bottom surface and the side surfaces are surrounded by walls of plastics or glass or the like. Accordingly, technology has been required, which is capable of operating correctly with a trace amount of liquid without generation of air bubbles.

As one technology for operating with the trace amount of liquid, there is a technology for transferring the liquid by utilization of electrostatic force. This technology utilizes a phenomenon (dielectrophoresis), where substances in an electric field are polarized and moved in a direction where the electric field is focused by electrostatic force, in the electric field generated by applying a DC or AC voltage between a plurality of electrodes. Specifically, liquid is set on one sheet of substrate or sandwiched between two sheets of substrates, and voltage is applied between the plurality of electrodes installed on the substrates to generate an electric field and move the liquid. For example, in Patent Document 1, liquid is transferred by arranging a plurality of electrodes on a substrate, placing the liquid to be transferred on the electrodes, and by applying sequentially the voltage to the plurality of electrodes at the vicinity of the liquid. In addition, in Patent Document 2, a measurement system has been reported, where a sample and a reagent are transferred as liquid, and the sample and the reagent are mixed between substrates to prepare reaction liquid. In the present description, devices utilizing dielectrophoresis are called a liquid transfer devices collectively. In a liquid transfer device, since walls are present only at the bottom surface or at two surfaces of the bottom surface and the upper surface, it is advantageous in reducing the amount of reaction liquid due to less entrainment of air bubbles in operating the liquid, as compared with a reaction container surrounded by walls at five surfaces thereof as in a conventional case.

Patent Document 1: JP-A-10-267801

Patent Document 2: U.S. Pat. No. 4,390,403

DISCLOSURE OF INVENTION

Problem to be Solved by the Invention

The surface of the above-described liquid transfer device requires arrangement of a plurality of electrodes for applying the voltage in order to transfer the liquid. Conventionally there was a problem of complexity in controlling a large number of these electrodes.

Means for Solving the Problem

The number of electrodes is reduced and control thereof is made easier, by installing concave and convex parts on the surface of a liquid transfer device, and transferring the liquid by utilizing the spontaneous restoring force of liquid to a spherical body by surface tension of liquid, in addition to electric transfer.

Other objects, features and advantages of the invention will become apparent from the following description of the embodiments of the invention taken in conjunction with the accompanying drawings.

BEST MODE FOR CARRYING OUT THE INVENTION

Figure 1:
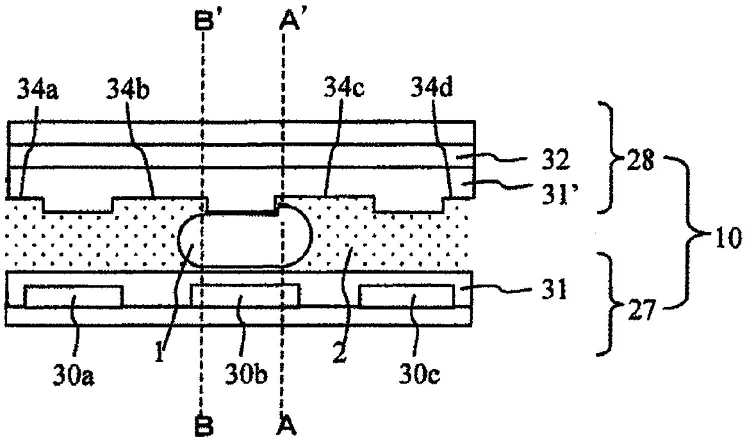
FIG. 1 is a configuration diagram of a liquid transfer device in the present invention.
Figure 2:
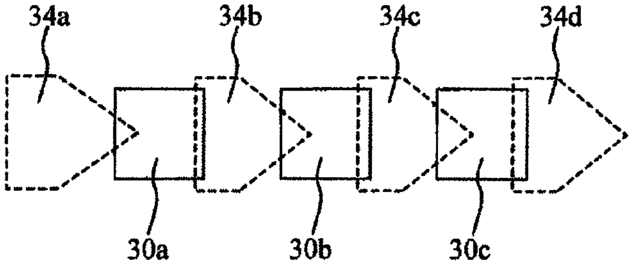
FIG. 2 is a perspective view of a liquid transfer device in the present invention.
Figure 3A:
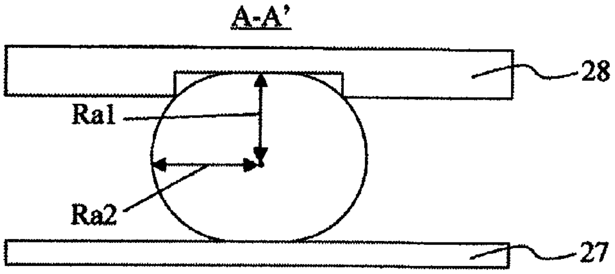
FIG. 3A is a cross-sectional view of liquid in a liquid transfer device in the present invention.
Figure 3B:
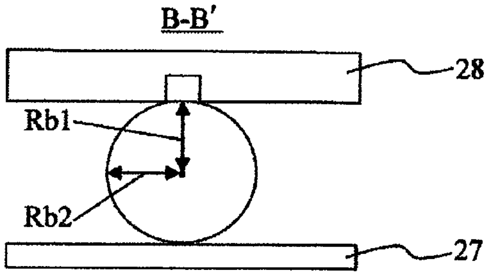
FIG. 3B is a cross-sectional view of liquid in a liquid transfer device in the present invention.

FIG. 1 shows a configuration diagram of a liquid transfer device installed with concave and convex parts. A liquid transfer device 10 is configured by two components of a lower side substrate 27 and an upper side substrate 28. The lower side substrate 27 is installed with a plurality of electrodes 30 (30*a*, 30*b* and 30*c*), and the upper side substrate 28 is installed with one common electrode 32, whose surfaces are covered with hydrophobic insulation membranes 31 and 31', respectively, and the insulation membrane 31' on at least a part of the upper side substrate 28 is installed with a concave and convex shape on the surface thereof. Oil 2 fills the space between the substrates, where a sample 1 is sandwiched. The concave parts are dimpled parts relative to the substrate surface, and other substrate surfaces are the convex parts. Or, the concave parts are the substrate surfaces themselves, and the convex parts are parts having a bulge relative to the substrate surfaces. When voltage is applied between the electrode 30 and the common electrode 32, liquid moves so as to take a position at just the center of the two electrodes, and takes a position at just over the electrode 30, that is, at the convex part. When the voltage is cut off, the liquid tries to return to a spherical shape and moves to the concave part. In this way, by having the concave and convex parts, liquid can be moved. FIG. 2 is an example of making the movement easier, and a perspective view representing arrangement of the concave parts and convex parts, when a liquid transfer device is viewed from the upper part. For simplicity, the concave parts 34 (34*a* to 34*d*) are drawn by broken lines, and the electrodes 30 (30*a* to 30*c*) installed on the lower side substrate are drawn by solid lines. The concave parts 34 are substantially asymmetric to the surface perpendicular to a transfer direction, and have a width shape, which becomes narrower toward one direction of a progression direction side. This is in order to provide the difference of curvature radius of the liquid positioned on an electrode. FIGS. 3A and 3B show cross-sectional views when liquid is positioned just over the electrode 30. FIG. 3A shows a cross-sectional view of liquid on the surface perpendicular to the plane of the paper along the A-A' line in FIG. 1, and FIG. 3B shows a cross-sectional view of liquid on the surface perpendicular to the plane of the paper along the B-B' line in FIG. 1. The concave part has smaller width at the B-B' side, and thus giving Rb1<Ra1 and Rb2<Ra2, provided that curvature radii of interfaces of the A-A' side of liquid are represented by Ra1 and Ra2 in FIG. 3A, and curvature radii of interfaces of the B-B' side of liquid are represented by Rb1 and Rb2 in FIG. 3B.

Here, ΔP, which is defined as pressure inside the liquid at one point on the liquid, is given by the following equation, provided that surface tension of the liquid is γ, and the curvature radii of the liquid in two planes perpendicular each other at that point are R1 and R2:

$$\Delta P=\gamma(1/R1+1/R2)$$

Accordingly, pressures ΔPa and ΔPb of the liquid at the progression direction side are represented as follows:

$$\Delta Pa=\gamma(1/Ra1+1/Ra2)$$

$$\Delta Pb=\gamma(1/Rb1+1/Rb2)$$

Because Rb1<Ra1 and Rb2<Ra2, ΔPb>ΔPa are satisfied, the liquid moves from the left side to the right side in the plane of the paper. That is, transfer force and direction are determined corresponding to difference of cross-sectional area in a plane perpendicular to a liquid transfer direction. The concave parts have, at least on a part, difference of cross-sectional area in a plane perpendicular to a liquid transfer direction. Difference of this cross-sectional area is generated by an asymmetrical shape of the concave part relative to a plane perpendicular to a transfer direction at the center of the concave part.

Figure 4:
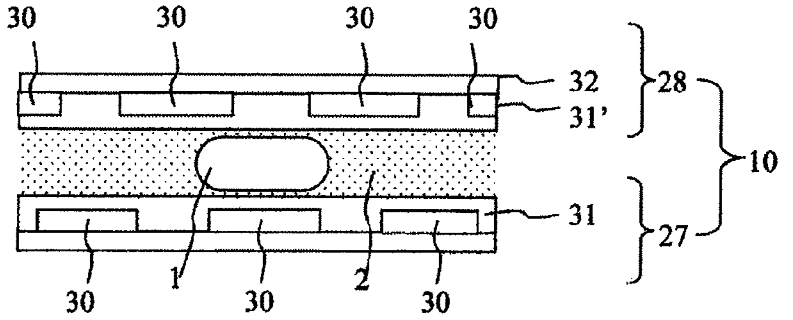
FIG. 4 is a configuration diagram of inside a conventional liquid transfer device.

FIG. 4 shows a configuration diagram of a conventional liquid transfer device. Because a conventional liquid transfer device required installment of electrodes at places corresponding to the concave parts of the present invention of FIG. 1 for smooth liquid transfer, the number of electrodes are twice the amount as compared with the embodiment of the present invention of FIG. 1. In the present invention, because the concave parts are installed among electrodes to be controlled, the number of the electrodes to be controlled can be halved as compared with a conventional liquid transfer device. In addition, in the present description, the concave parts are installed in multiple. However, even when a part of the plurality of the concave parts is connected, as long as the concave parts are substantially asymmetric to the surface perpendicular to a transfer direction, it is possible to substantially deform the liquid by the concave and convex parts, and move the liquid by utilization of the restoring force of the liquid to a spherical shape, and a similar effect can be obtained.

As described above, by making the liquid move by utilization of spontaneous restoring force of liquid to a spherical shape, it is possible to halve number of electrodes to be controlled in a liquid transfer device, and make the control easy.

Embodiment 1

In the present embodiment, a configuration of an analysis system using a liquid transfer device is shown, where a sample and a reagent are introduced into the liquid transfer device, each thereof is transferred and then mixed to prepare a reaction liquid, and after transferring the reaction liquid to a detection part, sample components are detected by absorbance measurement, and then it is discharged from the liquid transfer device.

Figure 5:
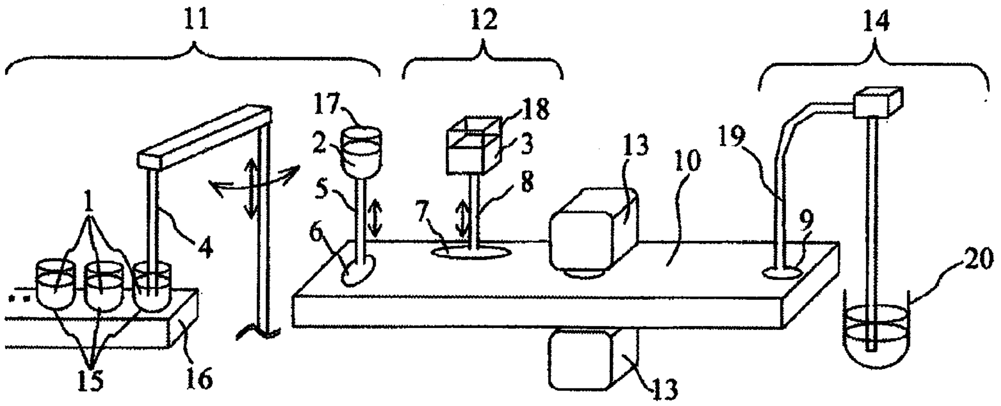
FIG. 5 is a schematic diagram of an analysis system in Embodiment 1 of the present invention.

FIG. 5 shows a total configuration of the analysis system. The analysis system is configured by the liquid transfer device 10, a sample introduction unit 11 for introducing a sample 1 and oil 2 into the liquid transfer device 10, a reagent introduction unit 12 for introducing the reagent into the liquid transfer device 10, a detection unit 13 for measuring components in the sample 1, and a discharge unit 14 for discharging the sample 1 and the oil 2 from the liquid transfer device 10. In the sample introduction unit 11, the sample 1 is, for example, accommodated in a sample container 15 on a sample stand 16, and in addition, the oil 2 is, for example, accommodated in an oil container 17 for each arrangement, and then each of the sample 1 and the oil 2 can be introduced into the liquid transfer device 10, from a sample introduction entrance 6 by a sample probe 4 and an oil probe 5, respectively, which can be driven up and down, and the sample probe 4 can be driven in a rotating direction. At the reagent introduction unit 12, the reagent 3 is, for example, accommodated in a reagent container 18, and the reagent 3 can be introduced into the liquid transfer device 10 from a reagent introducing entrance 7 by a reagent probe 8. The detection unit 13 is installed adjacent to the detection part, which is installed at least on a part of a liquid transfer passage, where the sample passes from introduction to the liquid transfer device 10 till discharging. In the discharge unit 14, a shipper 19 and a waste liquid tank 20 are arranged, and liquid transferred to a discharge exit 9 can be discharged from inside the liquid transfer device 10 to the waste liquid tank 20.

Figure 6:
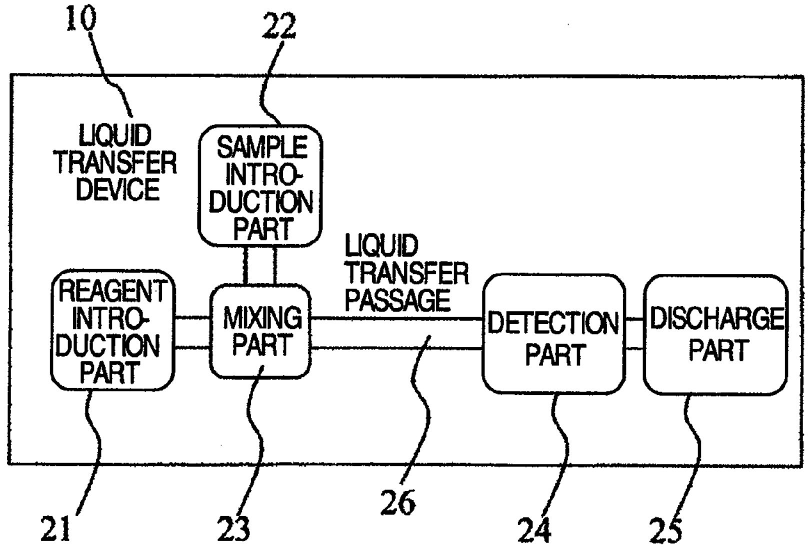
FIG. 6 is a layout drawing of each part of a liquid transfer device in the Embodiment 1 of the present invention.

FIG. 6 shows a layout drawing of each part for executing introduction, transfer, mixing, measurement and discharge, in the liquid transfer device 10. The liquid transfer device 10 is configured by a sample introduction part 22, a reagent introduction part 21, a mixing part 23 for mixing the sample and the reagent, a detection part 24 for measuring components of the sample, a discharge part 25 and a liquid transfer passage 26 for connecting each of the parts. At least on a part of each of the sample introduction part 22, the reagent introduction part 21, the mixing part 23, the detection part 24, the discharge part 25 and the liquid transfer passage 26, an electrode and concave and convex parts are arranged for transferring the liquid, and the liquid is transferred by voltage application control to the electrode and by surface tension of the liquid to return to a spherical shape in the region of the concave and convex parts.

Figure 7A:
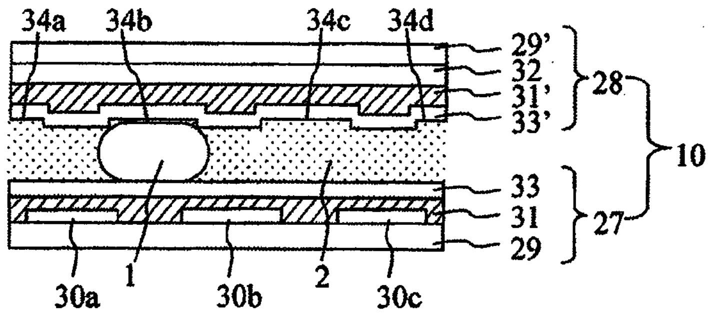
FIG. 7A is a cross-sectional view of a liquid transfer passage in Embodiment 1 of the present invention.
Figure 7B:
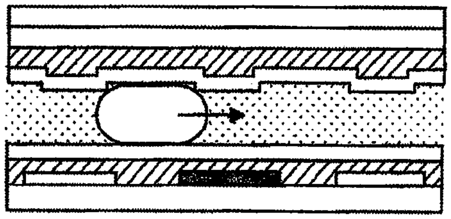
FIG. 7B is a cross-sectional view of a liquid transfer passage in Embodiment 1 of the present invention.
Figure 7C:
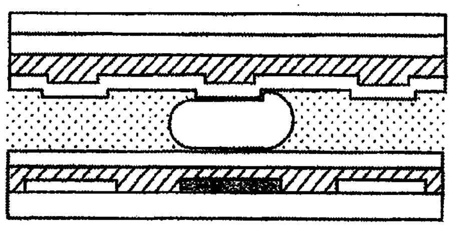
FIG. 7C is a cross-sectional view of a liquid transfer passage in Embodiment 1 of the present invention.

FIG. 7A shows a cross-sectional configuration diagram of the liquid transfer passage 26 in a transfer direction. The liquid transfer device 10 is configured by a lower side substrate 27, and an upper side substrate 28 having a plane facing to the lower side substrate 27. The lower side substrate 27 is arranged with a plurality of electrodes 30 (30*a*, 30*b* and 30*c*), at the upper surface of an insulation base substrate 29, along a transfer direction of the sample 1, and still more the surface thereof is covered with an insulation membrane 31. The upper side substrate 28 is arranged with one common electrode 32 at the lower surface of an insulating base substrate 29', and still more the surface thereof is covered with an insulation membrane 31'. Still more, at least a part of the surfaces of the insulation membranes 31 and 31' is coated with hydrophobic membranes 33 and 33', respectively, for furnishing a hydrophobic property so as to attain easy transfer of the sample 1. Between the upper side substrate and the lower side substrate, the sample 1 to be transferred is arranged, and oil 2 fills the surrounding area thereof. In the present embodiment, by installment of concave and convex parts at the insulation membrane 31' of the surface of the upper side substrate 28, a plurality of concave parts 34 (from 34*a* to 34*d* in the FIG.) and convex parts were installed on the surface of the upper side substrate 28. In order to transfer the sample by utilization of the restoring force of the sample to a spherical shape, by the concave parts 34, it is necessary to position the liquid at the convex parts, therefore the convex parts are required to be present thereon facing to the electrode 30. Accordingly, a part of the concave parts was positioned at just over the electrode 30, which is installed at the lower side substrate 27, and the centers of the concave parts 34 were positioned at the upper part vertical to a region between the electrode 30 and the adjacent other electrode 30. In the embodiment, quartz was used as the insulating base substrates 29 and 29', ITO (Indium-Tin Oxide) as the electrode 30 and the common electrode 32, $SiO_2$ membrane formed by CVD (Chemical Vapor Deposition) as the insulation membranes 31 and 31', and CYTOP(registered trademark) manufactured by Asahi Kasei Co. Ltd. as the hydrophobic membranes 33 and 33'. Thickness of the ITO was set to be 100 nm, and thickness of the insulation membranes 31 and 31' formed by CVD (Chemical Vapor Deposition) was set to be 1.5 μm. In addition, distance between the lower side substrate 27 and the upper side substrate 28 was set to be 0.5 mm, and height difference between the convex parts and concave parts of the upper side substrate was set to be 1 μm. In addition, a serum was used as the sample 1 in a liquid amount of 1 μL. Silicone oil was used as the oil 2, which is a surrounding medium. In the present embodiment, the above materials were used, however, pure water or a buffer solution may be used as the sample 1. In addition, DNA, latex particles, cells, magnetic beads and the like may be included. The oil 2 may be any one as long as the liquid is non-miscible to the liquid to be transferred. The insulating base substrates 29 and 29' may be substrates formed with insulation membranes such as oxide membranes or the like at conductive substrates made of Si or the like, or resin substrates. The insulation membranes 31 and 31' may also be polysilazane, SiN, Parylene or the like. The hydrophobic membranes 33 and 33' were formed at the insulation membranes 31 and 31', however, hydrophobic insulation membranes may be formed instead of the hydrophobic membranes 33 and 33', or insulation hydrophobic membranes may be formed instead of the insulation membranes 31 and 31'.

Figure 7D:
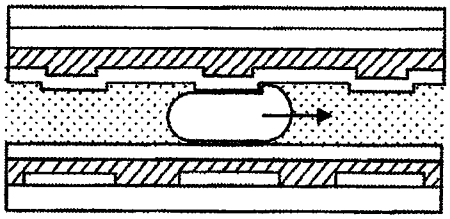
FIG. 7D is a cross-sectional view of a liquid transfer passage in Embodiment 1 of the present invention.
Figure 7E:
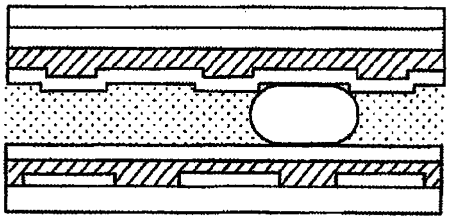
FIG. 7E is a cross-sectional view of a liquid transfer passage in Embodiment 1 of the present invention.

Then, procedures for transferring the liquid are shown in FIG. 7A to FIG. 7E. Starting from a state that the sample 1 is standing still in the concave part 34*b* of FIG. 7A, by connecting the common electrode 32 of the upper side substrate 28 to a ground line, and applying voltage between the common electrode 32 and the electrode 30*b* (the electrode with applied voltage is shown by the black painted mark), the sample 1 moves between the common electrode 32 and the electrode 30, that is, as positioned just over the electrode 30*b*. In the present application, the electrode 30 without applied voltage is in a floating state without connection to anywhere, and in the case of cutting the applied voltage, the electrode 30 is made in a floating state by stopping voltage application and after once making a ground connection of a control electrode 30. Then, when the applied voltage of the electrode 30*b* is cut off as shown in FIG. 7D, the sample 1 moves by surface tension from the convex parts to the right side concave part 34*c* having large curvature radius. Finally, the liquid moves to the center position of the concave part as shown in FIG. 7E. By repeating the procedures of the above FIG. 7A to FIG. 7E, the liquid sample 1 can be transferred under deformation.

In the present embodiment, the concave parts and the convex parts were formed on the surface, by installment of concave and convex parts at the insulation membrane 31' on the surface of the upper side substrate 28, however, the concave parts and convex parts can be formed on the surface also by installment of concave and convex parts at the base substrate 29' or the common electrode 32 or the hydrophobic membrane 33'. The above concave and convex shapes can be installed by various fabrication and molding methods such as wet etching or dry etching, CVD, or machine fabrication.

Figure 8:
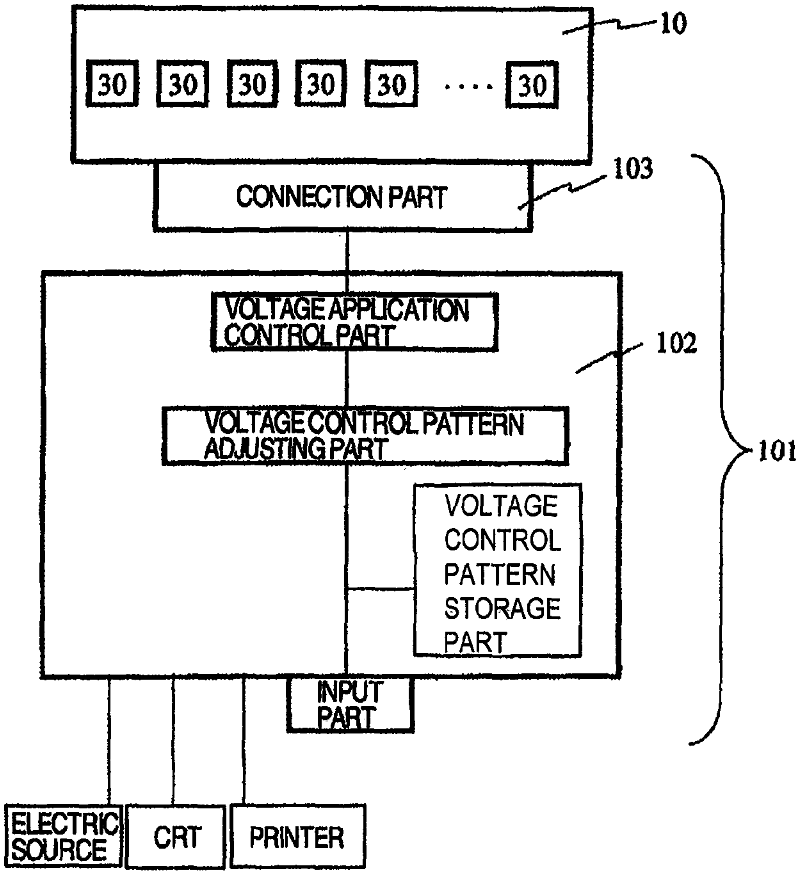
FIG. 8 is a schematic diagram of a control system of the present invention.

FIG. 8 shows a configuration of a voltage control means 101 for operating the sample 1 in the liquid transfer device 10. The present control means is installed with an analysis system shown in FIG. 1, and has a computer 102 for control, and a connection part 103 for applying voltage, controlled by the computer 102 for control, to a predetermined electrode of the liquid transfer device 10. To the computer for control, a CRT, a printer, and an electric source are connected. The computer for control is provided with an input part for inputting appropriate conditions on analysis objects or liquid transfer methods, a voltage control pattern storage part for memorizing the voltage control patterns corresponding to various liquid transfer methods, a voltage control pattern adjusting part for determining a combination of the voltage control patterns corresponding to the analysis objects, based on information input from the input part, and a voltage application control part for applying voltage, corresponding to the combination of voltage control patterns, which are determined by the voltage control pattern adjusting part, to the liquid transfer device 10. The connection part 103 is connected to the electrode 30 to be controlled, and in controlling the sample 1, voltage under control of the voltage application control part is applied to the predetermined electrode via the connection part 103, according to information input from the input part.

Figure 9:
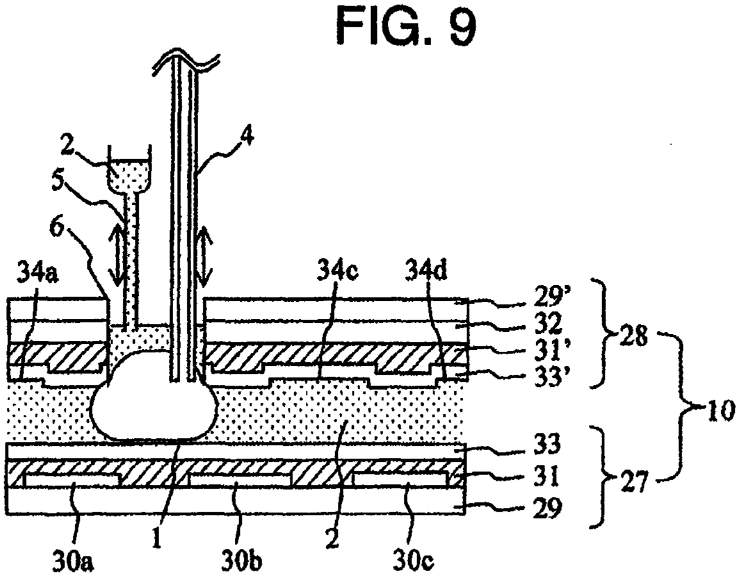
FIG. 9 is a cross-sectional view of a sample introduction part in Embodiment 1 of the present invention.

FIG. 9 shows a cross-sectional configuration view of the sample introduction part 22. The upper side substrate 28 is arranged with the sample introduction entrance 6, and installed with an oil probe 5 for introducing the oil 2 accommodated in the oil container 17, and a sample probe 4 for introducing the sample 1 accommodated in the sample container 15 on the sample stand 16, so as to be movable each up and down in the sample introduction entrance 6. Firstly, oil is supplied from the oil probe 5 to fill the whole inside of the liquid transfer device 10 with the oil 2. Then, after absorbing the sample 1 in the sample container 15 on the sample stand 16, the sample probe 4 is immersed into the oil 2 in the liquid transfer device 10 to extrude the sample 1, and the sample probe 4 is moved in an upper direction to release the sample 1 into the oil 2. By making the sample probe 4 pass through the oil-air interface, the sample can be introduced surely into the oil 2, without leaving the sample 1 at the tip of the sample probe 4. The sample 1 is transferred, by applying voltage to the electrode 30 after the introduction.

Figure 10:
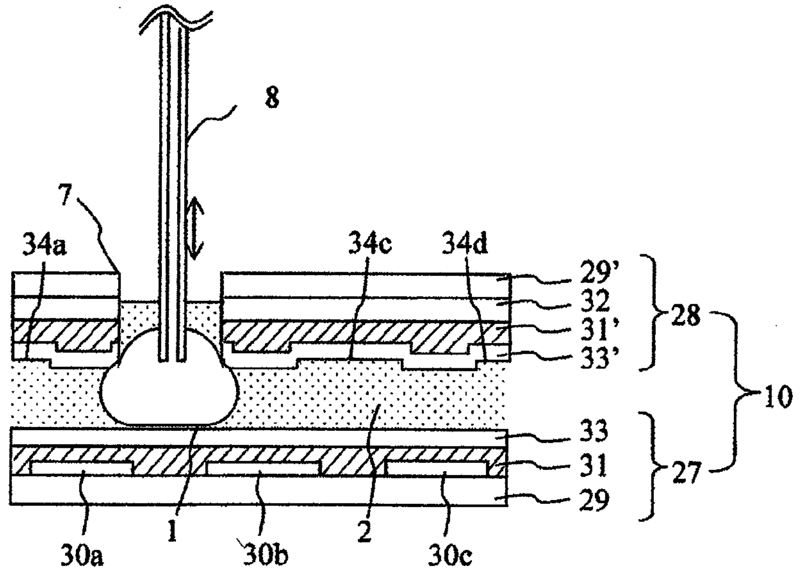
FIG. 10 is a cross-sectional view of a reagent introduction part in Embodiment 1 of the present invention.

FIG. 10 shows a cross-sectional configuration view of the reagent introduction part 21. The upper side substrate 28 is arranged with the reagent introduction entrance 7, and installed with the reagent probe 8 for introducing the reagent 3 accommodated in the reagent container 18 in the reagent introduction unit 12, so as to be movable up and down in the sample introduction entrance 7. The reagent probe 8 is immersed in the liquid transfer device 10 filled with the oil, to extrude the reagent 3, and by moving in an upper direction, the reagent 3 is released into the oil 2. By making the reagent probe 8 pass through the oil-air interface, the reagent 3 can be introduced surely into the oil 2, without leaving the reagent 3 at the tip of the reagent probe 8. The reagent 3 is transferred, by applying voltage to the electrode 30 after the introduction. In the present embodiment, an Autosera (registered trademark) TP reagent, manufactured by Daiichi Pure Chemicals Co., Ltd., was used.

Figure 11A:
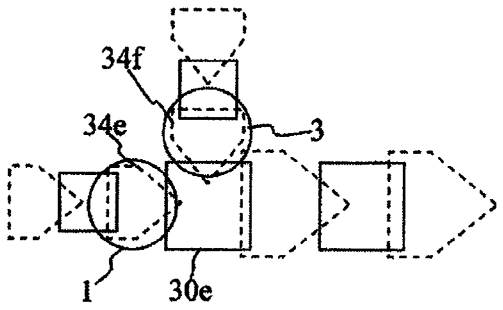
FIG. 11A is a schematic diagram of a mixing part in Embodiment 1 of the present invention.
Figure 11B:
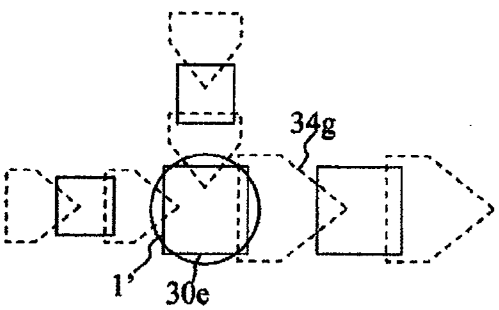
FIG. 11B is a schematic diagram of a mixing part in Embodiment 1 of the present invention.

Explanation will be given on configurations of the mixing part 23 in FIGS. 11A and 11B, by using perspective views thereof seen from the upper part. The electrode 30 of the lower side substrate 27 is shown by a solid line, the concave parts 34 of the upper side substrate are shown by a broken line, and the sample 1, the reagent 3 and reaction liquid 1' obtained by mixing the sample 1 and the reagent 3 are shown by a solid line circle shape. Because, in the mixing part, a liquid transfer passage 26, connecting the sample introduction part 21 and the mixing part 23, and a liquid transfer passage 26, connecting the reagent introduction part 22 and the mixing part 23, flow together, the electrode 30, which forms each of the liquid transfer passages 26, takes a configuration intersecting with the concave parts 34. When the sample 1 and the reagent 3 are standing still at the concave parts 34*e* and 34*f* as shown in FIG. 11A, once voltage is applied to the electrode 30*e*, the sample 1 and the reagent 3 move onto the electrode 30*e* as shown in FIG. 11B, and are mixed to become the reaction liquid 1'. Subsequently, when voltage applied on the electrode 30*e* is cut off, the reaction liquid 1' is moved and transferred to the concave part 34*g*. It is necessary to mix the components in the reaction liquid 1' positively to attain good reaction reproducibility, and, in the liquid transfer device installed with the concave and convex shapes on the surface, which is a configuration of the present invention, because a liquid surface shape varies by the concave parts and the convex parts, positive mixing of the inside is possible, resulting in enhancement of reaction reproducibility.

Figure 12:
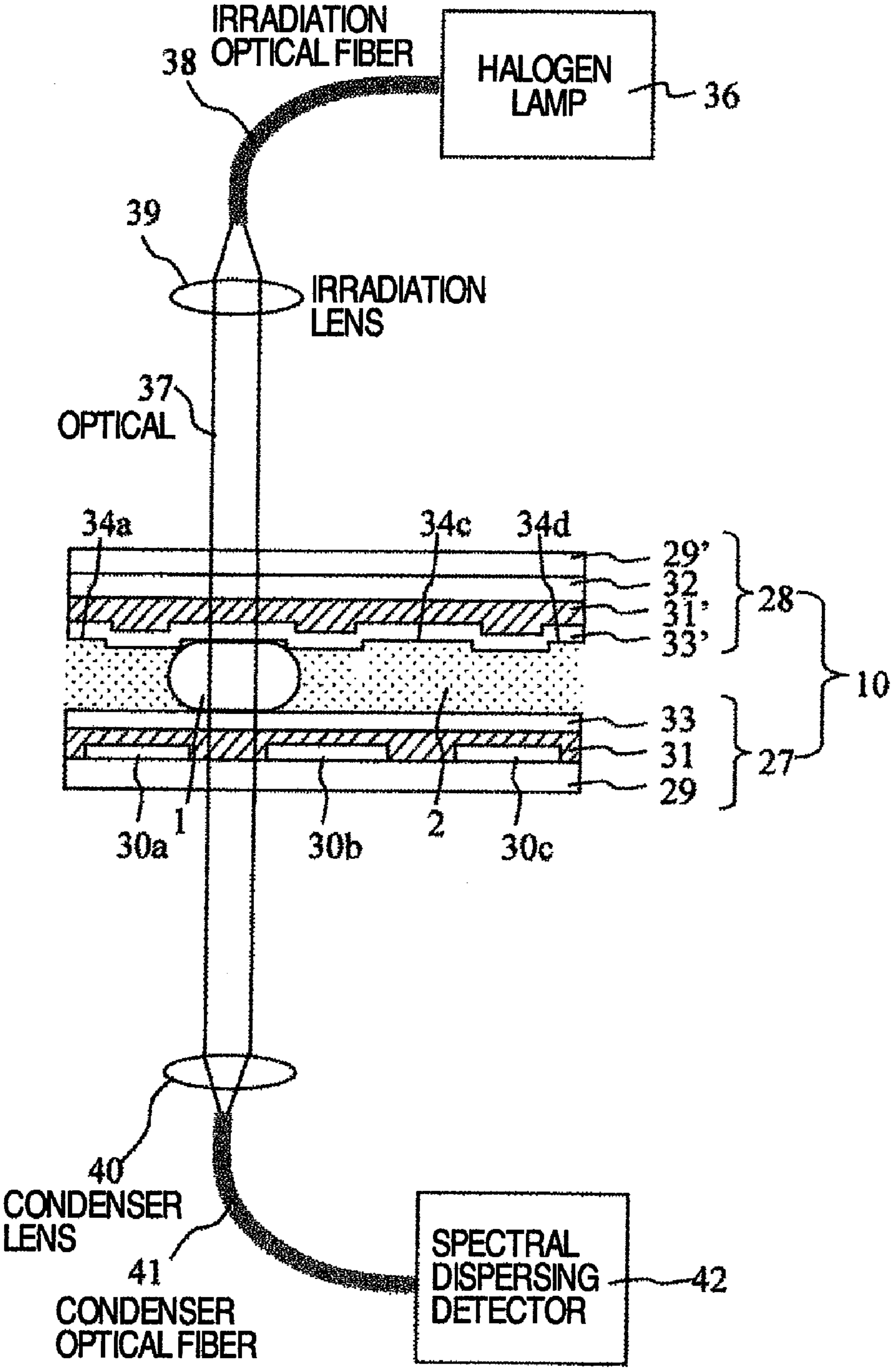
FIG. 12 is a schematic diagram of a detection part in Embodiment 1 of the present invention.

FIG. 12 shows a cross-sectional configuration view of the detection part 24 along with the detection unit 13. The detection unit 13 introduces light 37 from a halogen lamp 36, by an irradiation optical fiber 38, irradiates the detection part 24 by an irradiation lens 39, condenses the transmitted light at a condensing optical fiber 41 by a condenser lens 40, and detects the light by spectral dispersing to the wavelength necessary by a spectral dispersing detector 42. In the detection, the reaction liquid 1' was positioned at the concave parts. The center of the concave parts is positioned at the upper part vertical to a region between the electrode 30 and the electrode 30, and light emitted from a light source passes through the concave part 34 and is detected at the detection part. Because a conventional liquid transfer device, having the liquid of the detection part on an electrode, receives influence of the liquid caused by oil flow and may move around, it requires to be fixed there by always applying voltage, during the detection. According to a configuration of the present invention, because liquid is standing still at the concave parts and does not receive the influence of oil flow, it has the advantage of easy alignment being possible of light and liquid at the detection part. In the present embodiment, light with two wavelengths, 546 nm and 700 nm, were measured to quantitatively determine total protein concentration in a serum, based on difference of absorbance thereof.

Figure 13:
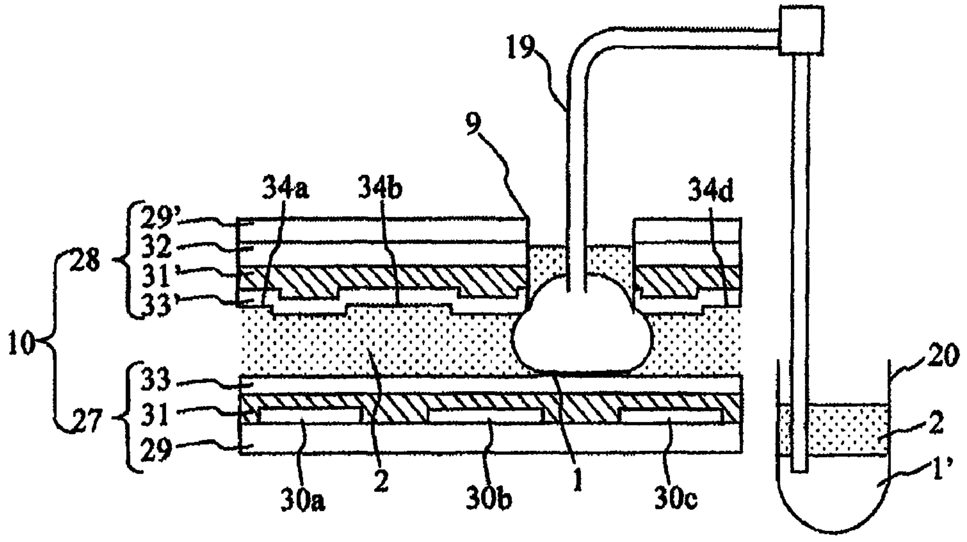
FIG. 13 is a cross-sectional view of a discharge part in Embodiment 1 of the present invention.

In the present application, a serum is mixed with a reagent in the liquid transfer device, and components in blood are determined by measuring absorbance. However, the determination is also possible by measuring turbidity without a reaction of the sample and the reagent, or by making a reaction with a plurality of reagents by installment of a plurality of reagent mixing parts. In addition, by blocking the transmitted light, it is applicable also to light emission measurement from the reaction liquid. FIG. 13 shows a cross-sectional configuration diagram of the discharge part 25. The discharge part 25 is arranged with the discharge exit 9 at the upper side substrate 28, and the reaction liquid 1' transferred to the discharge part 25 is suctioned to the shipper 19 of the discharge unit 14 through the discharge exit 9, and discharged to the waste liquid discharge tank 20. At this time, the oil 2 is also discharged, and, because the oil 2 collected and the reaction liquid 1' are separated in the waste liquid tank 20, due to difference of specific gravity, treatment of waste liquid afterwards is easy, even when many samples and surrounding oil are discharged.

It should be further understood by those skilled in the art that although the foregoing description has been made on embodiments of the invention, the invention is not limited thereto and various changes and modifications may be made without departing from the spirit of the invention and the scope of the appended claims.

INDUSTRIAL APPLICABILITY

By installment of concave and convex parts on the surface of a liquid transfer device as in the present invention, the number of electrodes for transferring the liquid can be reduced, and the liquid can be maintained in a stable state. In this way, the liquid can be transferred surely, and, in addition, liquid alignment at the detection part can be made easily.

The invention claimed is:

1. A liquid transfer device comprising:

a first substrate;

a plurality of electrodes disposed at a first surface of said first substrate;

a second substrate disposed facing to said first surface of said first substrate;

one common electrode disposed on a first surface of said second substrate, and facing to the one surface of said first substrate, and said common electrode provided with a plurality of concave parts and a plurality of convex parts on a surface of said common electrode; and a voltage application means for applying voltage to said common electrode and said plurality of electrodes, wherein at least a portion of said concave parts have a narrowing width in a liquid transfer direction.

2. The liquid transfer device according to claim 1, further comprising a plurality of insulation membranes covering each of said plurality of electrodes and said common electrode, and a hydrophobic membrane positioned on at least a part of each of said plurality of insulation membranes.

3. The liquid transfer device according to claim 1, wherein at least a portion of said concave parts have a difference in cross-sectional area in a liquid transfer direction.

4. A liquid transfer device comprising:

a first substrate;

a plurality of electrodes disposed at a first surface of said first substrate;

a second substrate disposed facing the first surface of said first substrate;

one common electrode disposed on a first surface of said second substrate, and facing said first surface of said first substrate;

an insulation membrane disposed on at least a part of a surface of said common electrode, and said insulation membrane has a plurality of concave parts and a plurality of convex parts on a surface of said insulation membrane; and a voltage application means for applying voltage to said common electrode and said plurality of electrodes, wherein at least a portion of said concave parts have a narrowing width in a liquid transfer direction.

5. The liquid transfer device according to claim 4, wherein a part of said convex parts are positioned facing said plurality of electrodes.

6. The liquid transfer device according to claim 4, wherein said concave parts are, at the center of the concave parts, asymmetric to a surface perpendicular to said liquid transfer direction.

7. The liquid transfer device according to claim 4, wherein at least a portion of said concave parts have a difference in cross-sectional area in a liquid transfer direction.

8. The liquid transfer device according to claim 4, wherein said concave parts are disposed corresponding to a region between adjacent ones of said plurality of electrodes.

9. The liquid transfer device according to claim 4, further comprising a light source and a detection part, wherein said concave parts are disposed corresponding to a region between adjacent ones of said plurality of electrodes, and light emitted from said light source passes through said concave parts, and is detected at said detection part.

10. The liquid transfer device according to claim 4, further comprising a hydrophobic membrane disposed on at least a part of said insulation membrane.

11. The liquid transfer device according to claim 4, wherein liquid to be transferred is deformed by said concave parts and said convex parts, and said liquid to be transferred is mixed.

12. A liquid transfer device comprising:

a first substrate;

a plurality of electrodes disposed at a first surface of said first substrate;

a second substrate disposed facing said first surface of said first substrate;

one common electrode disposed on a first surface of said second substrate, and facing said first surface of said first substrate;

an insulation membrane disposed on at least a part of a surface of said common electrode;

a hydrophobic membrane disposed on at least a part of a surface of said insulation membrane, and said hydrophobic membrane provided with a plurality of concave parts and a plurality of convex parts on a surface of said hydrophobic membrane; and a voltage application means for applying voltage to said common electrode and said plurality of electrodes, wherein at least a portion of said concave parts have a narrowing width in a liquid transfer direction.

13. The liquid transfer device according to claim 12, wherein at least a portion of said concave parts have a difference in cross-sectional area in a liquid transfer direction.

* * * * *